Figure 1:
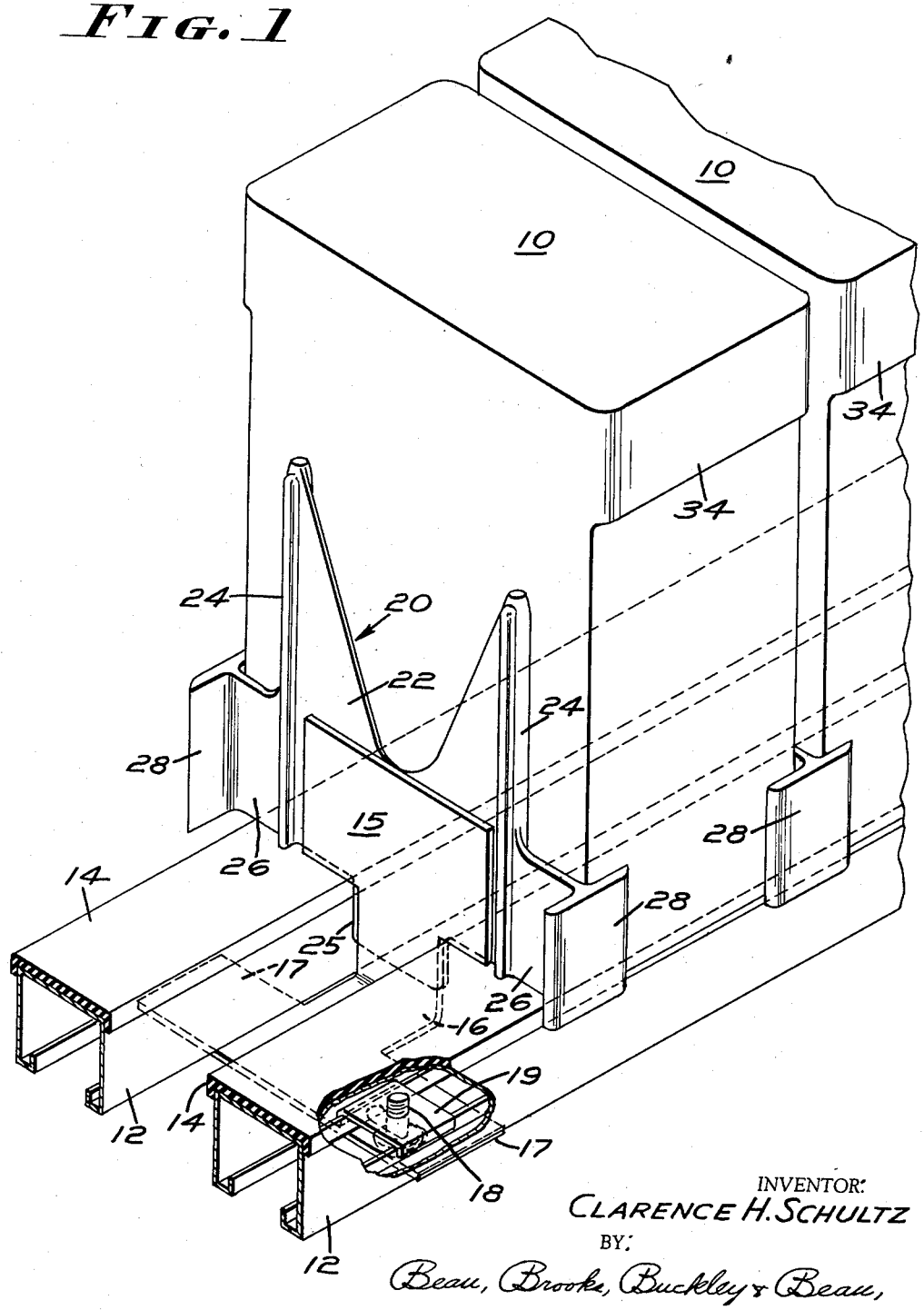

June 7, 1960

C. H. SCHULTZ 2,939,901

BATTERY CELL SPACER

Filed May 28, 1957

2 Sheets-Sheet 1

INVENTOR:
CLARENCE H. SCHULTZ
BY:
Beau, Brooks, Buckley & Beau,
ATTORNEYS.

June 7, 1960

C. H. SCHULTZ 2,939,901

BATTERY CELL SPACER

Filed May 28, 1957

2 Sheets-Sheet 2

INVENTOR:
CLARENCE H. SCHULTZ
BY:
Beau, Brooke, Buckley & Beau,
ATTORNEYS.

United States Patent Office 2,939,901
Patented June 7, 1960

2,939,901

BATTERY CELL SPACER

Clarence H. Schultz, West Seneca, N.Y., assignor to Gould-National Batteries, Inc., St. Paul, Minn.

Filed May 28, 1957, Ser. No. 662,251

5 Claims. (Cl. 136—173)

This invention relates to spacers for use intermediately of adjacent electrical storage battery cells when mounted stationarily in banks on storage racks and the like.

Storage batteries are often racked in banks, such as for standby emergency substitute power supply purposes; and in such case are typically mounted in end-to-end relation on wood or metal rails or shelf-like structures. External vibration effects such as from passing vehicles or other sources tend to jog the battery cells so as to hammer them against one another and/or to jog off their support. Various means have been improvised to hold such cells and to relatively insulate them, but such devices have been dependent upon the ingenuity of the battery user for efficacy, and have been only partially effective and otherwise a nuisance.

It is an object of the present invention to provide a novel and structurally simple combination spacer and holder device for slip-fitted insertion between adjacent cells of a row of battery cells; operable to prevent relative hammering between adjacent cells and/or displacement of the cells from their supporting structure when subjected to external vibration effects. Other objects and advantages of the invention will appear from the specification hereinafter.

Figure 2:
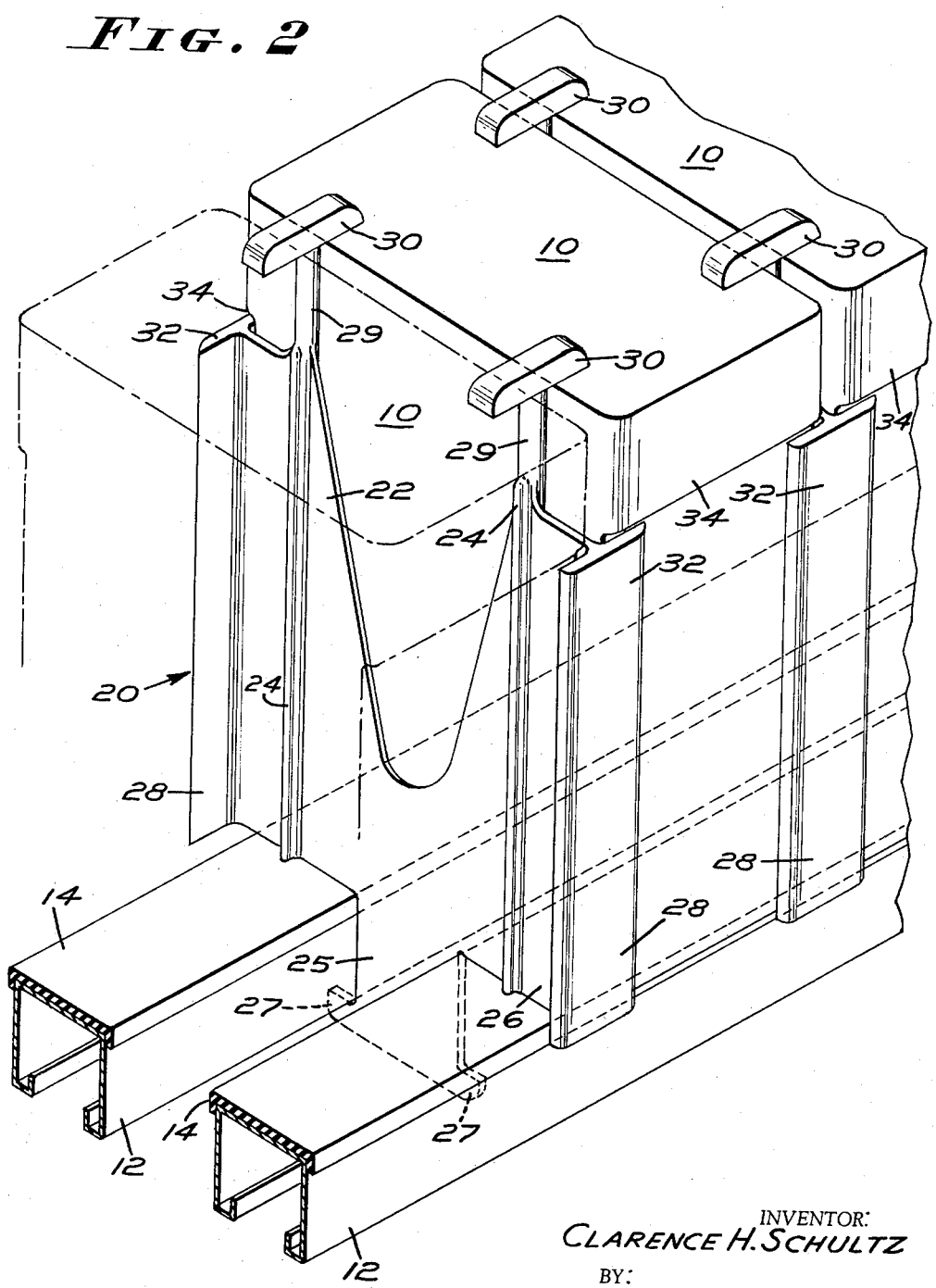

In the drawings:

Fig. 1 is a fragmentary perspective view of a bank of storage battery cells having combination spacer-holder devices of the present invention disposed therebetween; and Fig. 2 is a view corresponding to Fig. 1 but illustrating a modified form of device of the invention.

As illustrated in Fig. 1, a pair of storage battery cells designated 10—10 are mounted upon a horizontally extending rack comprising parallel steel stringers 12—12 which are typically provided with soft rubber pads 14 for cushioned vertical support of the cells. An end plate 15 is provided at each end of the bank of cells and extends vertically above the elevation of the stringers and is formed integrally with a T-shaped bracket 16 having end portions 17—17 carrying machine screws 18 engaging lock plates 19. The end portions 17—17 and the lock plates 19—19 embrace the bottom edges of the opposite stringers, and thus the end plate 15 is longitudinally adjustable on the stringers 12—12 and lockable thereon by means of the screws 18—18 to hold the bank of cells against endwise displacement from the stringers. However, it will be appreciated that any other end-stop means may be employed to hold the bank of cells against endwise shifting.

The combination spacer-holder of the present invention is illustrated generally at 20 to comprise an integral molded plastic fabrication including an upstanding central web portion 22 interconnecting parallel vertical rib portions 24—24; and having a centrally disposed tongue 25 extending down between the stringers 12—12, and laterally extending ears 26—26 at the opposite lower side portions of the ribs 24—24. The ears 26—26 terminate in transevrse flange portions 28 extending vertically and parallel with the ribs 24—24. The inside width dimension between the opposed flange portions 28—28 is regulated to complement the outside width dimensions of the cells to be accommodated.

Hence, it will be appreciated that the spacers 20 may be readily fabricated by simple molding processes in large quantity at low price; and that they may be readily slip-fitted in the attitudes shown in between adjacent cells of a bank of cells and at the opposite ends of the bank as shown in Fig. 1. The devices may be fabricated of any suitable material such as for example polystyrene; hard rubber; acrylic nitrile plastic; molded wood conversion formulations; metal castings or stampings; or the like. Thus, the rib portions 24—24 of the spacers snug the battery cells one to another while the flanges 28—28 operate to maintain the cells against shifting sidewise and off the stringers when vibrated; the tongues 25 functioning to hold the spacers in centralized position relative to the stringers.

Fig. 2 similarly illustrates in use a modified form of the combination spacer-holder of the invention wherein the downwardly extending tongue portion 25 of the device is formed with a pair of oppositely extending lateral hook portions 27—27 dimensioned and arranged to hook under the stringers 12—12. Hence, the spacers may be installed in functional positions by first turning them so that their planes are directed lengthwise of the space between the stringers, whereupon their tongue portions 25 may be lowered thereinto. Rotation of the devices into the attitudes shown in Fig. 2 thereupon disposes them in functional attitudes with the hook portions 27—27 engaged under the stringers 12—12. The devices may then be slid longitudinally of the stringers into operative positions as explained hereinabove.

As a further features of the invention as shown in Fig. 2, the rib portions 24—24 thereof are extended upwardly as indicated at 29—29 and carry at their upper ends integral cap portions 30—30 dimensioned to span the space between adjacent battery cells and to overhang the top edges of adjacent cell casings so as to maintain the cells in firmly held relation to the stringers 12—12. Furthermore, the flange portions 28—28 of the spacer devices of Fig. 2 are extended vertically as indicated at 32—32 so as to reach up to the conventionally provided overhanging lip portions 34 of the cell casings; while being disposed therebeneath. By virtue of this arrangement the spacers and cell casings are securely interlocked against any unintended relative displacements thereof, while the spacers are maintained against unintended displacements relative to the stringers.

I claim:

1. A spacer for storage battery cells when banked in side-by-side relation upon parallel stringers, said spacer being adapted to stand vertically between adjacent cells to relatively brace and insulate the adjacent side walls of the latter against vibration-induced buffeting and against displacement from the stringers, said spacer comprising an integrally molded plastic member having a central vertical web portion interconnecting a pair of parallel upstanding rib portions for bearing throughout their vertical lengths against the side walls of said cells, a tongue portion disposed centrally of the web portion and extending therebelow for slip-fitted insertion between the cell mounting stringers, and ear portions extending laterally from each of said rib portions and each terminating in a transverse flange portion extending sidewise therefrom in both directions and vertically to span the space between the adjacent cells and to bear against the adjacent corners of the side walls thereof, whereby said spacer is maintained by said tongue against lateral displacement from said stringers and whereby said rib portions relatively cushion adjacent cells against buffeting damage and whereby said flange portions maintain said cells in mutual alignment laterally and centralized upon said stringers.

2. A spacer for storage battery cells when banked in side-by-side relation upon parallel stringers, said spacer being adapted to stand vertically between adjacent cells to relatively brace and insulate the adjacent side walls of the latter against vibration-induced buffeting and against displacement from the stringers, said spacer comprising a unitary member having a central web portion interconnecting a pair of parallel rib portions for bearing throughout their vertical lengths against the side walls of said cells, a tongue portion extending below said web portion for slip-fitted insertion between the cell mounting stringers, ear portions extending laterally from each of said rib portions and each terminating in a transverse flange portion extending sidewise in both directions therefrom and vertically to span the spaces between the adjacent cells and to bear against adjacent corners of the side walls thereof at opposite sides of said cells, whereby said spacer is maintained by said tongue against lateral displacement from said stringers and whereby said rib portions relatively cushion adjacent cells against buffeting damage and whereby said flange portions maintain said cells in mutual alignment laterally and against lateral displacement relative to said stringers.

3. A spacer for storage battery cells when banked in side-by-side relation upon parallel stringers, said spacer being adapted to stand vertically between adjacent cells to relatively brace and insulate the adjacent side walls of the latter against vibration-induced buffeting and against displacement from the stringers, said spacer comprising a unitary member having a pair of parallel vertical rib portions for bearing throughout their vertical lengths against the side walls of said cells, ear portions extending laterally from each of said rib portions and each terminating in a transverse flange portion extending sidewise in both directions therefrom and vertically to span the spaces between adjacent cells and to bear against adjacent corners of the side walls thereof at opposite sides of said cells, whereby said rib portions relatively cushion adjacent cells against buffeting damage and whereby said flange portions maintain said cells in mutual alignment laterally.

4. A spacer for storage battery cells when banked in side-by-side relation upon a support, the casings of said cells having overhanging lip portions at their opposite sides, said spacer being adapted to stand vertically between adjacent cells to relatively brace and insulate the adjacent side walls of the latter against vibration-induced buffeting and against displacement from the support, said spacer comprising an integrally molded plastic member having a central vertical web portion interconnecting a pair of parallel upstanding rib portions for bearing throughout their vertical lengths against the side walls of said cells, a tongue portion disposed centrally of the web portion and extending therebelow for engagement with the cell mounting support, and ear portions extending laterally from each of said rib portions and each terminating in a transverse flange portion extending sidewise in both directions therefrom and vertically to positions abutting the bottoms of said casing lip portions to span the spaces between adjacent cell casings and to bear against the adjacent corners of the side walls thereof, whereby said spacer is maintained by said tongue against lateral displacement from said support and whereby said rib portions relatively cushion adjacent cells against buffeting damage and whereby said flange portions maintain said cells in mutual alignment laterally and centralized upon said support.

5. A spacer for storage battery cells when banked in side-by-side relation upon a shelf-like support, said spacer being adapted to stand vertically between adjacent cells to relatively brace and insulate the adjacent side walls of the latter against vibration-induced buffeting and displacement from the support, said spacer comprising an integrally molded member having a central vertical web portion interconnecting parallel upstanding rib portions for bearing throughout their vertical lengths against the side walls of said cells, a tongue portion extending below said web portion and provided with a hook device for detachably hooking to said support, and ear portion extending laterally from each of said rib portions and terminating in a transverse flange portion extending sidewise in both directions therefrom and vertically to bear against the adjacent corners of the side walls of said cells, whereby said spacer is maintained by said tongue against displacement from said support and whereby said rib portions relatively cushion adjacent cells against buffeting damage and whereby said flange portions maintain said cells in mutual alignment laterally and against lateral displacement from said support.

References Cited in the file of this patent

UNITED STATES PATENTS

| | | |
|---|---|---|
| 1,044,549 | Lowe | Nov. 19, 1912 |
| 1,068,250 | Koenig | July 22, 1913 |
| 1,298,857 | Angell | Apr. 1, 1919 |
| 1,716,610 | Wilson et al. | June 11, 1929 |